United States Patent
Davidson et al.

(10) Patent No.: US 10,600,436 B1
(45) Date of Patent: Mar. 24, 2020

(54) SLIDER WITH TRAILING EDGE TOP BOND PAD INTERCONNECT

(71) Applicant: Seagate Technology LLC, Cupertino, CA (US)

(72) Inventors: Paul Davidson, Eden Prairie, MN (US); Aaron Collins, Minneapolis, MN (US); Scott D. Matzke, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/239,641

(22) Filed: Jan. 4, 2019

(51) Int. Cl.
*G11B 5/48* (2006.01)
*G11B 5/60* (2006.01)

(52) U.S. Cl.
CPC .......... *G11B 5/4853* (2013.01); *G11B 5/4826* (2013.01); *G11B 5/60* (2013.01)

(58) Field of Classification Search
CPC ........ G11B 5/4826; G11B 5/4853; G11B 5/60
USPC .......... 360/234.5, 234.8, 235.3, 235.7, 245.8
See application file for complete search history.

(56) References Cited

U.S. PATENT DOCUMENTS

| | | | |
|---|---|---|---|
| 5,200,869 A * | 4/1993 | Matsuzaki | G11B 5/6005 360/234.5 |
| 5,610,783 A * | 3/1997 | Maffitt | G11B 5/3106 360/234.5 |
| 5,774,975 A * | 7/1998 | Maffitt | G11B 5/3106 29/603.12 |
| 5,914,834 A | 6/1999 | Gustafson | |
| 5,949,618 A | 9/1999 | Arya et al. | |
| 6,985,332 B1 * | 1/2006 | Sluzewski | G11B 5/3103 360/234.5 |
| 6,989,967 B2 | 1/2006 | Pendray et al. | |
| 7,254,885 B2 | 8/2007 | Hipwell, Jr. et al. | |
| 7,593,190 B1 | 9/2009 | Thornton et al. | |
| 7,619,857 B2 * | 11/2009 | Kurita | G11B 5/6005 360/235.3 |
| 7,929,248 B2 * | 4/2011 | Zhu | G11B 5/4853 360/234.5 |
| 7,952,833 B2 | 5/2011 | Smith | |
| 8,054,584 B2 | 11/2011 | Limmer et al. | |
| 8,400,736 B2 * | 3/2013 | Greminger | G11B 5/4853 360/234.5 |
| 8,810,966 B1 | 8/2014 | Zhong | |
| 8,902,547 B1 * | 12/2014 | Zhong | G11B 5/56 360/234.5 |
| 8,947,830 B1 * | 2/2015 | Collins | G11B 5/4853 360/234.5 |
| 9,786,308 B1 * | 10/2017 | McNeill | G11B 5/4853 |
| 2006/0044689 A1 | 3/2006 | Lille | |
| 2006/0114610 A1 * | 6/2006 | Krause | B82Y 10/00 360/234.5 |

(Continued)

*Primary Examiner* — Jefferson A Evans

(74) *Attorney, Agent, or Firm* — Westman, Champlin & Koehler, P.A.

(57) ABSTRACT

An apparatus includes a slider body with a first portion formed of a first insulating material and a second portion formed of a second insulating material that is different from the first insulating material. The second portion of the slider body is at a trailing edge of the slider body and the second portion includes a bearing surface and a top surface opposite the bearing surface. A plurality of bond pads are disposed on the top surface of the second portion such that an entire bottom surface of each of the plurality bond pads is attached to the top surface of the second portion.

13 Claims, 8 Drawing Sheets

(56) References Cited

U.S. PATENT DOCUMENTS

| | | | | |
|---|---|---|---|---|
| 2007/0153421 A1* | 7/2007 | Sugiura | ............... | G11B 5/102 360/235.3 |
| 2008/0170326 A1* | 7/2008 | Feng | ................ | G11B 5/4853 360/99.04 |
| 2008/0180850 A1* | 7/2008 | Rice | .................. | G11B 5/4826 360/245.9 |
| 2009/0195930 A1* | 8/2009 | Lille | ................... | G11B 5/102 360/234.5 |
| 2011/0157750 A1* | 6/2011 | Zhu | .................... | G11B 5/102 360/245.8 |
| 2016/0111115 A1* | 4/2016 | Fujimura | ............ | G11B 5/4826 174/251 |
| 2016/0282257 A1* | 9/2016 | Kashima | ............... | G01N 19/04 |

* cited by examiner

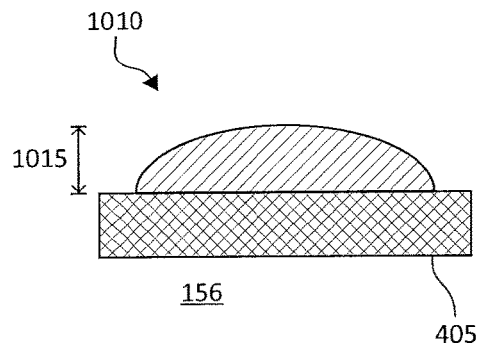
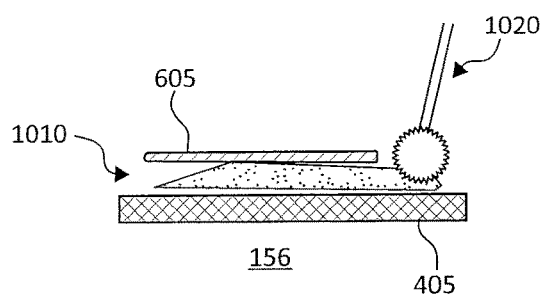
FIG. 10A  FIG. 10B
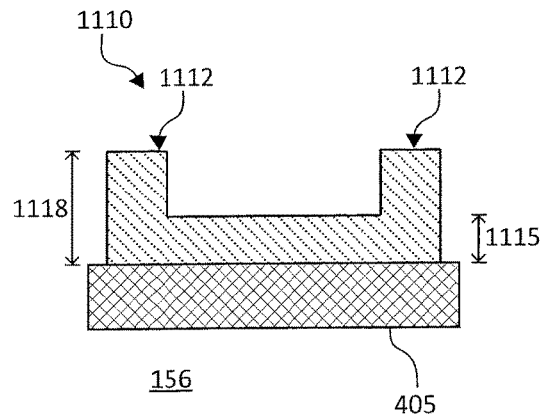
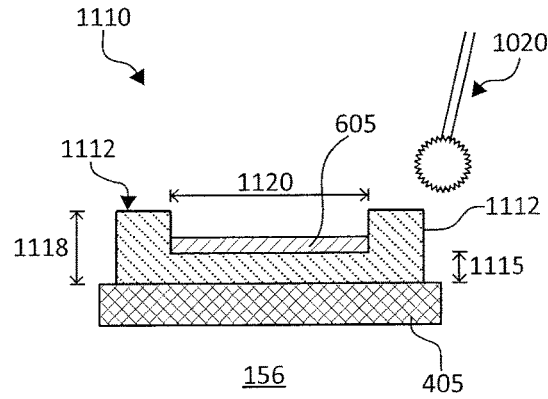
FIG. 11A  FIG. 11B

SLIDER WITH TRAILING EDGE TOP BOND PAD INTERCONNECT

SUMMARY

In one embodiment, an apparatus is provided. The apparatus includes a slider body comprising a first portion formed of a first insulating material and a second portion formed of a second insulating material that is different from the first insulating material. The second portion is at a trailing edge of the slider body and the second portion includes a bearing surface and a top surface opposite the bearing surface. The apparatus includes a plurality of bond pads disposed on the top surface of the second portion such that an entire bottom surface of each of the plurality bond pads is attached to the top surface of the second portion.

In another embodiment, a head gimbal assembly is provided. The head gimbal assembly includes a suspension circuit comprising a plurality of suspension bond pads. The head gimbal assembly further includes a slider overlaid on the suspension flex circuit. The slider includes a slider body comprising a leading edge opposite a trailing edge and a bearing surface opposite a top surface. The slider further includes a plurality of slider bond pads disposed on the top surface along the trailing edge such that each of the plurality of slider bond pads align opposite the suspension bond pads on the suspension flex circuit. The top surface of the slider body is coupled to a suspension surface of the suspension flex circuit. The head gimbal assembly includes a conductive material disposed on each of the plurality of slider bond pads, the conductive material electrically coupling the slider bond pads to the suspension bond pads.

In another embodiment, a method of forming an electrical interconnect between a slider and a suspension is provided. The method includes providing a slider with a plurality of slider bond pads on a trailing top surface. The method also includes placing solder on each of the plurality of slider bond pads. The method further includes positioning a suspension having a plurality of suspension bond pads over the slider, such that the slider bond pads are aligned opposite to the suspension bond pads. The method then includes mechanically attaching the slider to the suspension and forming a solder joint between each of the slider bond pads and the suspension bond pads by reflowing the solder.

Other features and benefits that characterize embodiments of the disclosure will be apparent upon reading the following detailed description and review of the associated drawings.

BRIEF DESCRIPTION OF THE DRAWINGS

FIGS. 10A and 10B are diagrammatic illustrations showing conductive material on a slider bond pad according to embodiments of the present disclosure.

FIGS. 11A and 11B are diagrammatic illustrations showing conductive material on a slider bond pad according to embodiments of the present disclosure.

DETAILED DESCRIPTION

Figure 1:
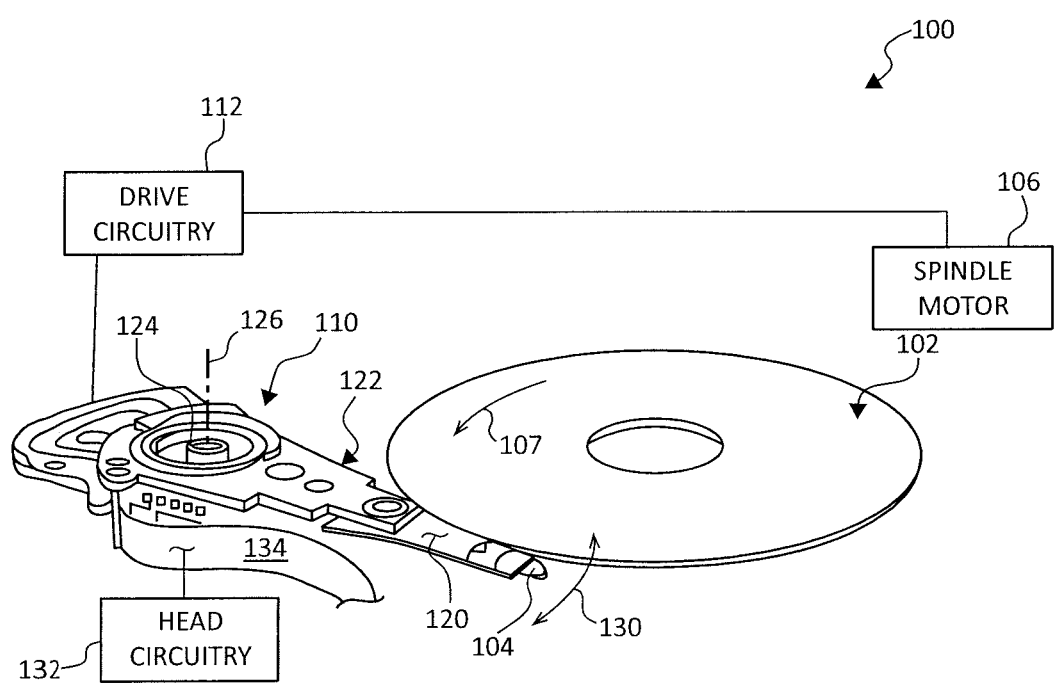
FIG. 1 illustrates an embodiment of a data storage device in which embodiments of the present application can be used.

Although the present disclosure has been described with reference to embodiments, workers skilled in the art will recognize that changes may be made in form and detail without departing from the scope of the disclosure.

Recording heads progressively add more recording head features as technology advances. Head Gimbal Assembly (HGA) electrical interconnects are formed between a slider which carries the features and a suspension flex circuit by forming a solder connection between slider bond pads and suspension bond pads. Recording head features use electrical interconnects to connect with data storage device circuitry through the suspension flex circuit. As recording head features are added, the number of interconnects used to support those features increases as well.

To form an interconnect, a slider is placed on a suspension with suspension trace bond pads such that the slider bond pads are perpendicular to the suspension trace bond pads. A mechanical system may be used to jet solder spheres to connect the slider bond pads to the suspension trace bond pads in a thermal interconnect (TIC) process. The present disclosure generally describes forming HGA interconnects by placing slider bond pads on the trailing top edge of the slider (opposite the air-bearing surface of the slider) to couple with suspension pads on a suspension flex circuit overlay to form the interconnect. Solder bumps may be placed on the slider bond pads prior to coupling the slider to the suspension flex overlay. However, prior to providing additional details regarding the different embodiments, a description of an illustrative operating environment is provided below.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 shows an illustrative operating environment in which certain slider interconnect embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. As shown in FIG. 1, the data storage device 100 includes a data storage medium or disc 102 and a head 104. The head 104 including transducer elements (not shown in FIG. 1) is positioned above the data storage medium 102 to read data from and/or write data to the data storage medium 102. In the embodiment shown, the data storage medium 102 is a rotatable disc or other storage medium that includes a storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection. The head 104 may include a top surface bond pad interconnect feature to connect to the head or slider to the suspension assembly according to embodiments of the present disclosure.

The transducer elements of the head 104 are coupled to signal processing circuitry or head circuitry 132 through flex circuit 134, also known as printed circuit cable assembly (PCCA), to encode and/or decode data to and from electrical signals. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is coupled to a frame or deck (not shown) through a bearing 124 to pivot about axis 126. Rotation of the actuator mechanism 110 moves the head 104 in an arc across the disc in approximately cross track directions as illustrated by arrow 130.

Figure 2:
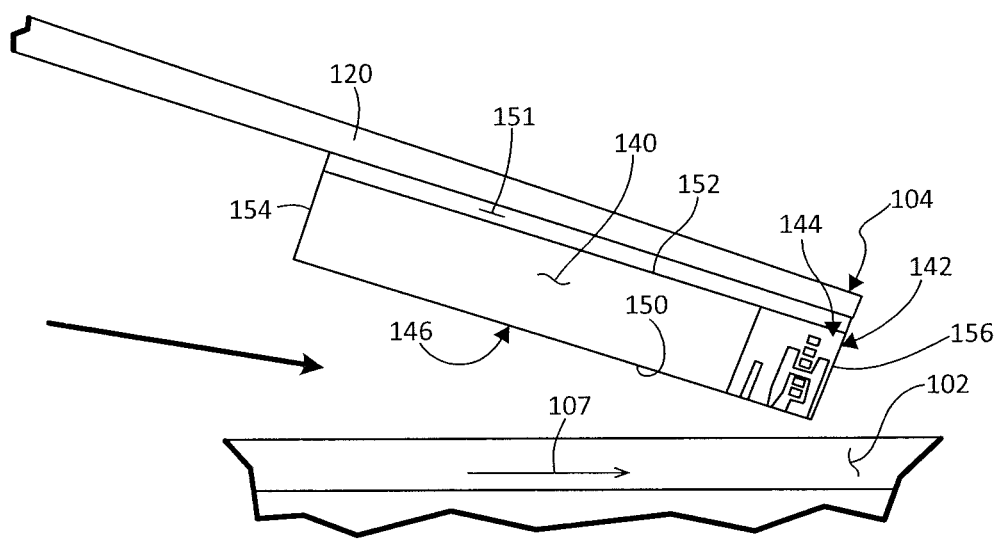
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown includes read and write elements encapsulated in an insulating structure to form a transducer assembly 144 of the head. As shown, the head 104 includes a bearing surface (for example, air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air or gas flow in direction 107 as shown in FIG. 2 along the bearing surface 146 of the slider 140 from a leading end or edge 154 to the trailing end or edge 156 of the slider 140 or head 104. The air or gas flow along the bearing surface 146 creates a pressure cushion to support the head 104 and slider 140 above the medium 102 for read and/or write operations. As shown, the transducer portion 142 is formed at or near the trailing edge 156 of the slider 140. It should be noted that a recording head such as 104 may include elements such as a writer heater, a reader heater, a thermal asperity sensor, etc., which are not shown in the interest of simplification.

Figure 3:
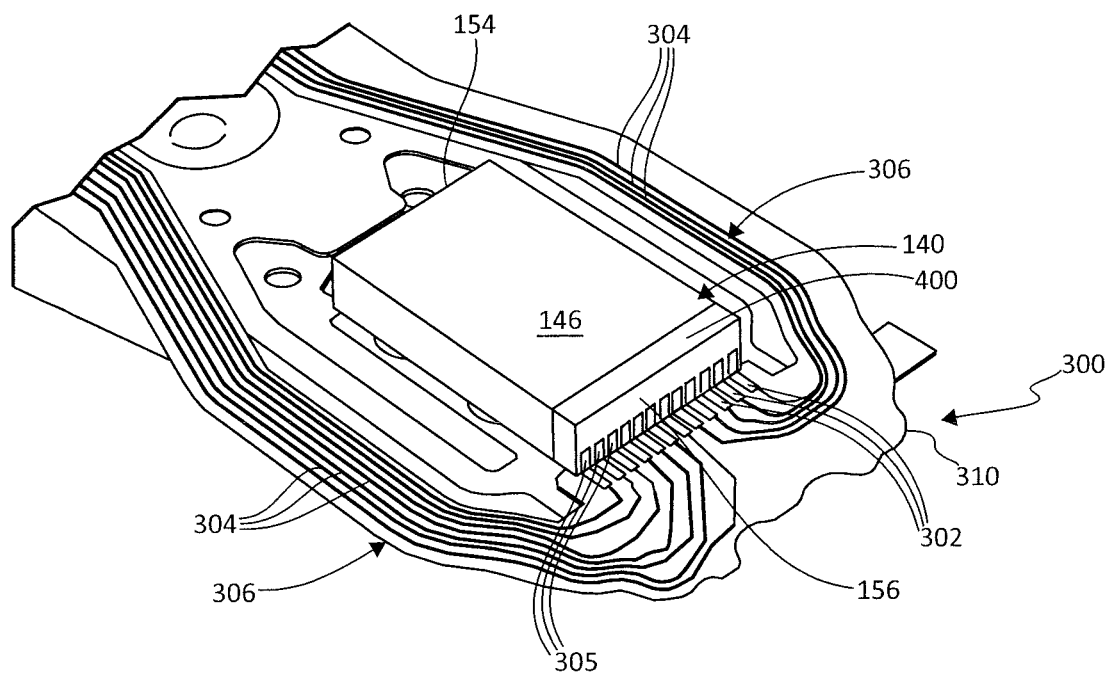
FIG. 3 is a diagrammatic illustration showing an interconnect portion providing an electrical interface to electrical elements of a recording head.

FIG. 3 is an embodiment showing an interconnect portion 300, also known as a TGA, providing an electrical interface to electrical elements of a recording head 104. In FIG. 3, slider 140 having a leading edge 154 and a trailing edge 156 is shown with its ABS 146 facing upwards. As can be seen in FIG. 3, the TGA 300 includes a plurality of suspension trace bond pads 302 on a suspension surface 310 coupled to the traces 304 along spaced gimbal arms 306 of a flex circuit extending along opposed sides of the slider 140 to electrically connect the transducer element(s) of the recording head 104 (e.g., transducer assembly 144 shown in FIG. 2) to the signal processing circuitry 132 (shown in FIG. 1). The interconnect portion 300 may include opposing bond pad interconnect features to connect the slider 400 to the suspension assembly according to embodiments of the present disclosure.

It should be noted that, instead of routing the flex circuit on opposite sides of the slider 140, the flex circuit may be routed between the slider 140 and the suspension load beam. In one embodiment, the traces 304 and bond pads 302 are formed of copper, gold, or other conductive material. Bond pads 302 connect to head or slider bond pads 305. Different schematic diagrams of slider-suspension trace bond pad connections in accordance with certain embodiments are shown in FIGS. 4-11 and described below.

Figure 4:
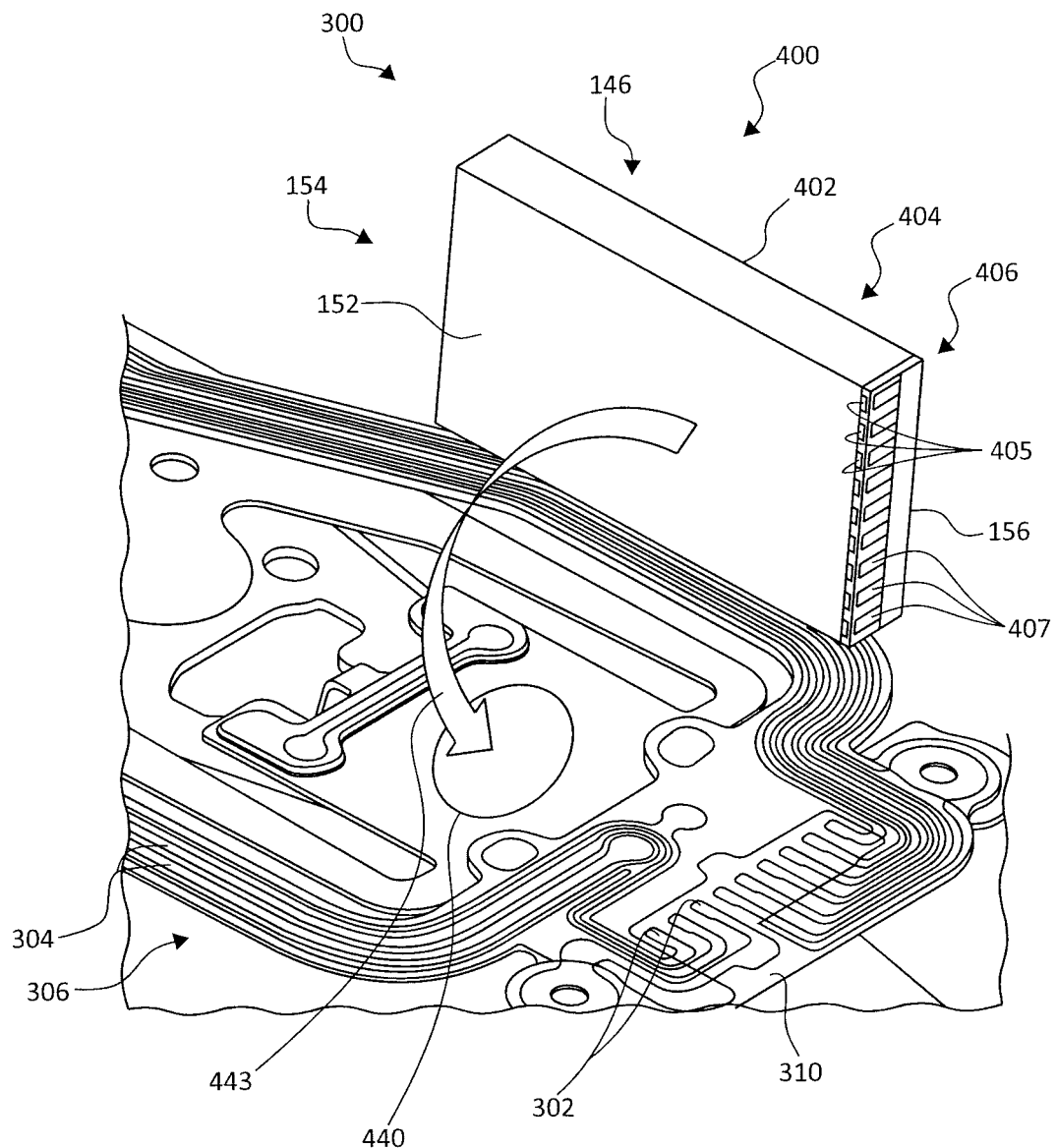
FIG. 4 is a diagrammatic illustration showing the formation of an interconnect portion which provides an electrical interface to electrical elements of a recording head.

FIG. 4 is an embodiment showing the formation of TGA 300 with a slider 400 having slider bond pads 405 disposed on the top surface 152 of the trailing edge 156 of the slider body 402. The slider body 402 is comprised of a first portion 404 formed of a first insulating material and a second portion 406 formed of a second insulating material. The second portion being at the trailing edge 156 of the slider body 402. The plurality of slider bond pads 405 are disposed on the top surface 152 of the second portion 406 such that an entire bottom surface of each of the plurality of bond pads 405 is attached to the top surface 152 of the second portion 406. In one embodiment, a plurality of end bond pads or test pads 407 are disposed on a surface of the trailing edge 156 such that an entire bottom surface of each of the plurality of test pads 407 is attached to the trailing edge 156. The test pads 407 may remain free and are not bonded to suspension bond pads 302 to remain available for probing. In one example, first portion 404 comprises an AlTiC material and second portion 406 comprises Alumina.

Slider 400 may be attached to suspension flex pad or suspension surface 310 to form interconnect 300. As can be seen, top surface 152 may be placed on suspension surface 310 as shown by arrow 443 and secured by an adhesive 440 such that each of top surface 152 slider bond pads 405 may be overlaid opposite to align with corresponding suspension bond pads 302 on suspension flex circuit or suspension surface 310.

Figure 5A:
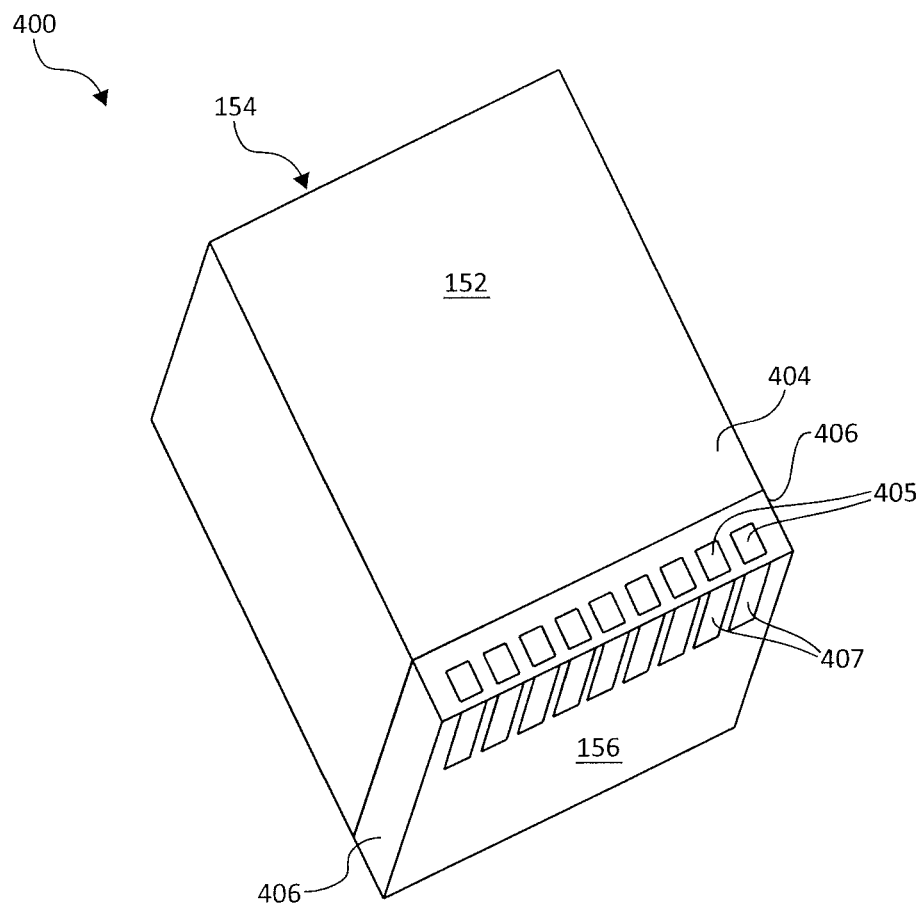
FIG. 5A is a diagrammatic illustration showing a slider with top bond pads according to an embodiments of the present disclosure.

FIG. 5A illustrates a simplified view of slider 400 with a plurality of top bond pads 405. As can be seen, slider bond pads 405 are disposed on the top surface 152 of the second portion 406 and end bond pads 407 are disposed on the trailing surface 156 perpendicular to the bond pads 405.

Figure 5B:
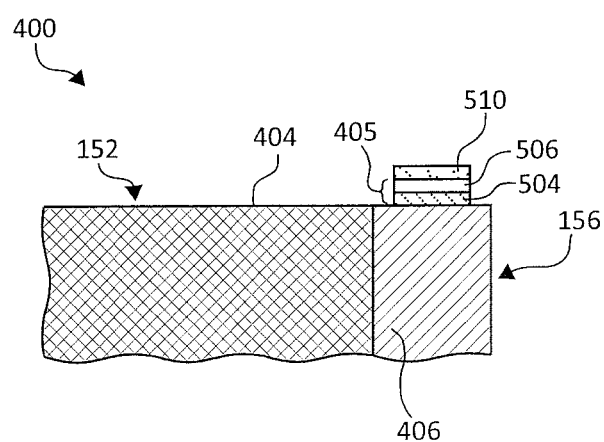
FIG. 5B is a side view showing the slider of FIG. 5A.

FIG. 5B illustrates a simplified side view of slider 400. Bond pads 405 placed on top surface 152 of second portion 406 may include a first layer 504 and a second layer 506. First layer 504 may comprise an adhesion layer with the second portion 406 of slider 400. In one example, first layer 504 may be formed of a Ti adhesion layer. Second layer 506 may comprise a barrier layer disposed on top of first layer 504. In one example, second layer 506 may be formed of a Ni barrier layer. A solder layer 510 may be placed on bond pad 405 prior to slider 400 attachment to suspension surface 310. In this manner, trailing edge top bond pads 405 may compliment adhesive 440 (shown in FIG. 4) in providing mechanical strength for the slider to suspension attachment.

Various suspensions may be used with slider 400 to form an interconnect according to embodiments of the present disclosure. For example, a standard trace/lead suspension such as TGA 300 (of FIGS. 3 and 4) may be used with a slider 400 with top bond pads 405, the TGA 300 including suspension bond pads 302 on a suspension surface 310 coupled to the traces 304 along spaced gimbal arms 306 of a flex circuit suspension. However, alternative suspensions may be utilized.

Figure 6:
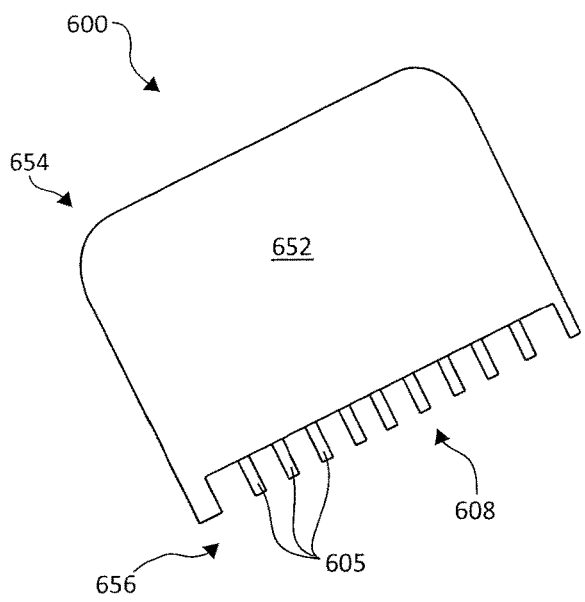
FIGS. 6-8 are a diagrammatic illustrations showing embodiments of suspension flex circuit overlays for providing an electrical interface according to embodiments of the present disclosure.

FIG. 6 illustrates a top view of a flex circuit overlay 600. Flex circuit overlay 600 includes a top surface 652 having a leading edge 654 and a trailing edge 656. An opening is formed along the trailing edge 656 such that a plurality of leads or suspension bond pads 605 may span the opening 608. In this embodiment, the suspension bond pads 605 comprise flying leads which extend outward into opening 608 and remain unsupported on the trailing edge 656 of the flex overlay 600. Flex overlay 600 may be overlaid on slider 400 such that top surface 152 of slider 400 is coupled to a surface of flex overlay 600 opposite top surface 652 (e.g., suspension surface 310). Each of the plurality of leads 605 may contact corresponding slider bond pads 405 when flex overlay 600 is coupled to slider 400. In one example, leads 605 are Au plated.

It should be noted that FIGS. 5-11 are exemplary only and have been simplified to illustrate the embodiments of the present disclosure, therefore, some features such as traces, gimbal arms, gimbal springs, etc. are not shown. For example, flex overlay 600 is one embodiment of a suspension, such as suspension surface 310, which carries suspension bond pads. Thus, flex overlay 600 may include traces (e.g., traces 304) extending from the suspension bond pads (e.g., flying leads 605) to electrically couple slider transducer elements to signal processing circuitry 132. In one embodiment, the traces may be placed on a surface of the flex overlay extending from suspension bond pads towards the leading edge 654. However, a variety of trace configurations may be utilized without departing from the scope of the disclosure.

Figure 7:
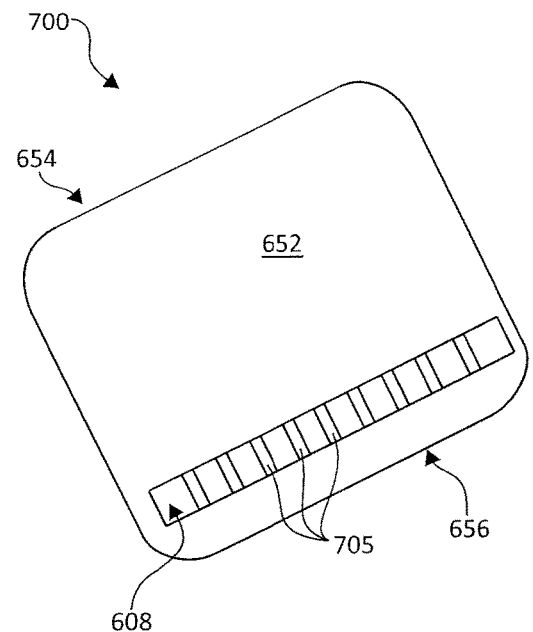

FIG. 7 illustrates an alternative flex overlay 700 with enclosed leads 610. Here, flex overlay 700 encompasses opening 608 such that leads 705 span opening 608 from the leading edge 654 of opening 608 to trailing edge 656 of the opening 608. The encompassed flying leads or or leads 705 are exposed within opening 608 such that leads 705 may contact slider bond pads 405 when overlay 700 is coupled to slider 400.

Figure 8:
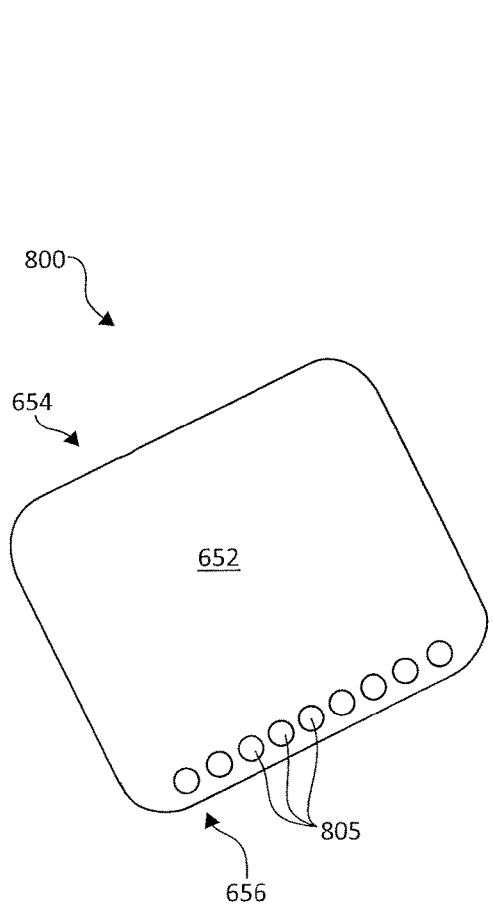

FIG. 8 illustrates an alternative flex overlay 800 with exposed flex overlay pads 805 for forming an interconnect. Pads 805 are disposed along trailing edge 656 of flex overlay 800 and each may align with corresponding slider bond pads 405.

Figure 9:
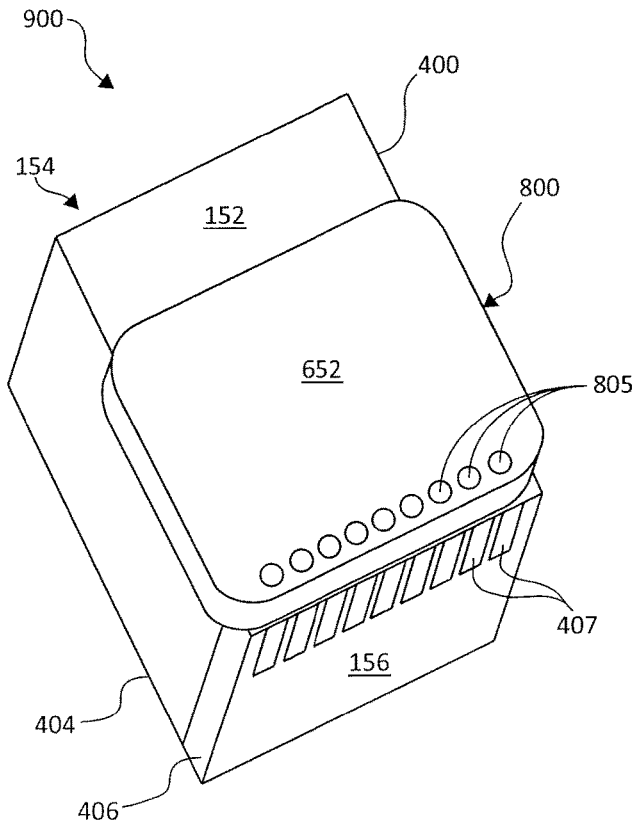
FIG. 9 is a diagrammatic illustration showing an interconnect portion according to embodiments of the present disclosure.

FIG. 9 illustrates an interconnect 900 between a flex overlay and a slider with top surface bond pads. Here, an interconnect is formed with flex overlay 800. Although flex overlay 800 is illustrated, alternative flex overlays (e.g., flex overlay 600, 700) may be similarly interconnected. As can be seen, flex overlay 800 is placed on surface 152 of slider 400 such that pads 805 are overlaid on slider bond pads (not shown) on second portion 406 of the slider 400. The overlay bond pads 805 and slider bond pads 405 are thus opposite (e.g., aligned parallel) to each other rather than adjacent (e.g., aligned perpendicular). Further shown are end bond pads 407 which remain exposed on trailing surface 156. Thus, an interconnect is made between flex overlay 800 and a slider 400 when flex overlay pads 805 are overlaid on corresponding top surface slider bond pads 405 with a conductive material electrically coupling the slider bond pads to the flex overlay or suspension bond pads.

Conductive material comprising a layer of solder, such as a solder sphere or solder bump, may be placed on each of the plurality of slider bond pads 405 prior to coupling a slider to a suspension or flex overlay (e.g., flex overlay 600). Suspension bond pads (e.g., suspension pads 302, flex lead 605, pad 805, etc.) may be aligned with each of the plurality of slider bond pads 405 such that the suspension pads are in contact with the solder bump on each of the slider bond pads when the slider 400 is coupled to the suspension (e.g., suspension 310, flex overlay 600, etc.). The solder bumps may then be heated to make the solder reflow. The solder bump is melted in this reflowing while in contact with the slider bond pad and its corresponding suspension bond pad. The reflowing results in both bond pads being wetted (e.g., the solder is molten and will adhere to the bond pads) which connects them together to form an interconnect. A variety of reflow methods may be used.

FIGS. 10A and 10B illustrate a simplified front view of the trailing edge of a slider bond pad 405 (e.g., trailing edge 156) with a standard solder bump 1010. Solder bump 1010 may comprise a height 1015 above the slider bond pad 405 to allow a suspension bond pad, such as flex lead 605, to contact the solder bump 1010 during attachment to the suspension (e.g., suspension 310, flex overlay 600, etc.). Although flex lead 605 is illustrated, a variety of suspension bond pads 302 may be used according to embodiments of the present disclosure.

FIG. 10B illustrates an interconnect using solder bump 1010 being formed using laser energy 1020. The slider bond pad 302A is aligned with suspension flex lead 605 to form HGA interconnect. Laser energy 1020 may be localized such that it is targeted at the solder 1010 to heat and reflow the solder 1010 to form a connection between the flex leads 605 and slider bond pads 405. Alternatively, laser energy 1020 may be targeted at the flex overlay (e.g., flex overlay 600, 700, 800) which in turn transfers heat to the underlying solder plated slider bond pad 405.

FIGS. 11A and 11B illustrate a simplified front view of the trailing edge of a slider bond pad 405 (e.g., trailing edge 156) with an encapsulating solder bump 1110. Solder bump 1110 may comprise height 1015 above the slider bond pad 405 to allow a suspension bond pad, such as flex lead 605, to contact the solder bump 1110 during attachment to the suspension (e.g., suspension 310, flex overlay 600, etc.). Solder bump 1110 includes end pillars 1112 which extend vertically to a height 1118 above slider bond pad 405 to encapsulate a suspension bond pad. Solder bump 1110 is configured to contain a suspension bond pad between end pillars 1112 and may enhance solder wetting.

FIG. 11B shows an interconnect using solder bump 1110 being formed with laser energy 1020. Suspension flex lead 605 is aligned with slider bond pad 405 and placed on solder bump 1110 between end pillars 1112 to form the HGA interconnect. End pillars 1112 comprise a separation width 1120 greater than a flex lead 605 width to contain the flex lead 605 therebetween. Laser energy 1020 is used to heat the solder 1110 creating a solder reflow connection between the flex leads 605 and slider bond pads 405.

Although laser energy 1020 is depicted in FIGS. 10 and 11, various reflow methods may be used to melt conductive material to form an interconnect between a slider and suspension. The methods may include but are not limited to laser energy, hot air, and infra red (IR) or oven heat methods. Conductive material with different properties may also be used. One example of a standard TIC solder which may be used is a SnAgCu solder which has a melt temperature of 217° C. The conductive material may also comprise a low temperature solder which can be reflowed using lower temperatures. Examples of low temperature solders include BiSn solder with a melt temperature of 138° C. or InSn solder with a melt temperature of 118° C.

Further, the solder may be reflowed at the same time adhesive 440 is cured or thermally accelerated. Alternatively, the solder may be reflowed using localized laser heat or through oven heat after the adhesive bond is formed.

Forming electrical interconnects according to embodiments of the present disclosure include providing a slider with a plurality of bond pads on the top surface of the alumina at the trailing edge. A layer of solder or a solder bump is provided on each of the plurality of slider bond pads. A suspension flex overlay is provided with a plurality of suspension bond pads configured to align with corresponding slider bond pads and the suspension overlay is placed above the slider such that suspension bond pads are in contact with the corresponding solder plated slider bond pads. The solder is then reflowed to wet both bond pads and form an interconnect. The slider may also be mechanically attached to the slider using an adhesive or other means. In one embodiment, a mechanism may be used to apply downward pressure to hold the suspension bond pads to the solder plated slider bond pads during the reflow process.

Figure 12:
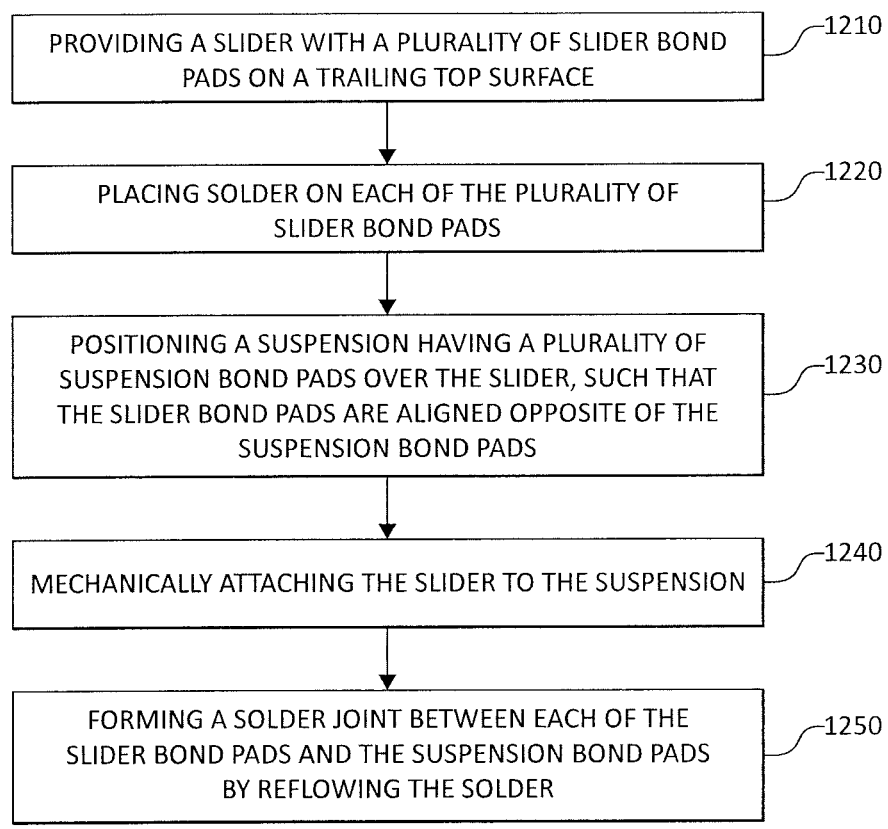
FIG. 12 is a flow diagram illustrating a method of making an interconnect between a slider and suspension according to an embodiment of the present disclosure.

FIG. 12 is a flow diagram illustrating a method 1200 of forming an electrical interconnect between a slider and a suspension which includes providing 1210 a slider with a plurality of slider bond pads on a trailing top surface. The method also includes placing 1220 solder on each of the plurality of slider bond pads. The method further includes positioning 1230 a suspension having a plurality of suspension bond pads over the slider, such that the slider bond pads are aligned opposite to the suspension bond pads. The method then includes mechanically attaching 1240 the slider to the suspension and forming 1250 a solder joint between each of the slider bond pads and the suspension bond pads by reflowing the solder.

By using bond pads that are confined to the alumina, or second portion, on the top surface at the trailing edge of the slider, high density interconnects are possible. Bond pads may be reduced in size and the spaces between the pads may be reduced to create high density pads. Further, placing bond pads along the trailing edge may reduce the length of the top bond traces utilized. The embodiments also allow conventional adhesive to be used at the gimbal bond as the mechanical attachment between the slider and suspension. Suspension bond pads such as pads 302 or flex leads 605 may comprise Au plating. The exposed pads or test pads 407 on the trailing edge 156 of the slider 400 may also comprise Au or Cu plating.

It should be noted that although materials such as copper, gold, and other conductive materials have been discussed, the materials need not be so limited. Sliders and slider bond pads, and suspension assemblies and suspension trace bond pads may use industry standard materials or various other materials without departing from the scope of the disclosure.

The illustrations of the embodiments described herein are intended to provide a general understanding of the method of the various embodiments. The illustrations are not intended to serve as a complete description of all of the elements and features of methods and systems described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, although a slider with bond pads on a trailing edge have been discussed herein, the embodiments need not be so limited, and opposing bondable surfaces may be used to form conductive interconnects in various designs and applications without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:
1. An apparatus comprising;
    a slider body comprising a first portion formed of a first insulating material and a second portion formed of a second insulating material that is different from the first insulating material, the second portion including a trailing edge of the slider body, the second portion comprising a bearing surface and a top surface opposite the bearing surface;

a plurality of slider bond pads disposed on the top surface of the second portion such that an entire bottom surface of each of the plurality of slider bond pads is attached to the top surface of the second portion;

a suspension comprising flying leads aligned in parallel to the slider bond pads; and a solder bump on each different slider bond pad, with each solder bump directly physically coupled to the slider bond pad and directly physically coupled to the flying lead over the top surface of the second portion of the slider body.

2. The apparatus of claim 1, wherein the flying leads comprise encompassed flying leads.

3. The apparatus of claim 1, wherein the slider body and the suspension are coupled with an adhesive.

4. The apparatus of claim 1, wherein the slider body further comprises a plurality of test pads on a surface of the trailing edge of the slider body.

5. The apparatus of claim 1, wherein each solder bump comprises vertically extending end pillars to encapsulate the flying lead directly physically coupled to the solder bump.

6. A head gimbal assembly comprising:

a slider body comprising a first portion formed of a first insulating material and a second portion formed of a second insulating material that is different from the first insulating material, the second portion including a trailing edge of the slider body, the second portion comprising a bearing surface and a top surface opposite the bearing surface;

a plurality of slider bond pads disposed on the top surface of the second portion such that an entire bottom surface of each of the plurality of slider bond pads is attached to the top surface of the second portion;

a suspension flex circuit comprising flying leads aligned in parallel to the slider bond pads; and a solder bump on each different slider bond pad, with each solder bump directly physically coupled to the slider bond pad and directly physically coupled to the flying lead over the top surface of the second portion of the slider body.

7. The assembly of claim 6, wherein the slider body further comprises a plurality of test pads on a surface of the trailing edge of the slider body.

8. The assembly of claim 6, wherein the slider body and the suspension flex circuit are coupled with an adhesive.

9. The assembly of claim 6, wherein each solder bump comprises vertically extending end pillars to encapsulate the flying lead directly physically coupled to the solder bump.

10. A method of forming an electrical interconnect between a slider and a suspension comprising:

providing a slider with a plurality of slider bond pads on a trailing top surface, the slider having a body including a first portion formed of a first insulating material and a second portion formed of a second insulating material that is different from the first insulating material, the second portion including a trailing edge of the slider and the trailing top surface;

placing solder on each of the plurality of slider bond pads;

positioning a suspension having a plurality of flying leads over the slider, with the slider bond pads aligned opposite to the flying leads;

mechanically attaching the slider to the suspension; and forming a solder joint between each of the slider bond pads and the flying leads over the trailing top surface by reflowing the solder.

11. The method of claim 10, and further comprising applying pressure to hold the flying leads to the slider bond pads while forming the solder joint.

12. The method of claim 10, wherein the solder is reflowed using localized laser energy.

13. The method of claim 10, wherein the solder is reflowed using hot air, IR energy, or oven heat.

* * * * *